(12) United States Patent
Bell

(10) Patent No.: US 11,581,770 B2
(45) Date of Patent: Feb. 14, 2023

(54) STATOR WITH EXTENDED INSULATOR FOR ELECTRIC MACHINE

(71) Applicant: Cummins Generator Technologies Limited, Peterborough (GB)

(72) Inventor: Adrian Bell, Peterborough (GB)

(73) Assignee: Cummins Generator Technologies Limited, Peterborough (GB)

( * ) Notice: Subject to any disclaimer, the term of this patent is extended or adjusted under 35 U.S.C. 154(b) by 274 days.

(21) Appl. No.: 16/604,251

(22) PCT Filed: Apr. 10, 2018

(86) PCT No.: PCT/GB2018/050949
§ 371 (c)(1),
(2) Date: Oct. 10, 2019

(87) PCT Pub. No.: WO2018/189523
PCT Pub. Date: Oct. 18, 2018

(65) Prior Publication Data
US 2020/0044505 A1    Feb. 6, 2020

(30) Foreign Application Priority Data

Apr. 11, 2017   (GB) .................................... 1705833

(51) Int. Cl.
*H02K 3/24*      (2006.01)
*H02K 1/16*      (2006.01)
(Continued)

(52) U.S. Cl.
CPC .................. *H02K 3/24* (2013.01); *H02K 1/16* (2013.01); *H02K 3/12* (2013.01); *H02K 3/345* (2013.01);
(Continued)

(58) Field of Classification Search
CPC .. H02K 3/24; H02K 1/16; H02K 3/12; H02K 3/345; H02K 9/06; H02K 15/10
See application file for complete search history.

(56) References Cited

U.S. PATENT DOCUMENTS 1,231,620 A * 7/1917 Kuyser .................... H02K 9/06
                                                    310/63
1,920,309 A * 8/1933 Hoseason ................ H02K 9/06
                                                    310/62
(Continued)

FOREIGN PATENT DOCUMENTS

EP        0 881 749 A2    12/1998
EP        1 191 665 A1    3/2002
(Continued)

OTHER PUBLICATIONS

International Search Report for International Patent Application No. PCT/GB2018/050949 dated Jul. 23, 2018, 14 pages.
(Continued)

*Primary Examiner* — Tulsidas C Patel
*Assistant Examiner* — Viswanathan Subramanian
(74) *Attorney, Agent, or Firm* — Foley & Lardner LLP

(57) ABSTRACT

A stator for a rotating electrical machine is disclosed, the stator comprising a plurality of stator slots (22) each of which accommodates a plurality of coils (40) of stator windings (18). Radial air gaps (46) are present between the coils of adjacent stator slots as the coils extend out of the stator slots. Insulating means (42, 54, 84) are provided between the coils of a stator slot as the coils extend out of the stator slot. The radial air gaps (46) are defined between the insulating means of the coils of adjacent stator slots. This can allow radial air passages to be formed through the windings, while ensuring sufficient electrical insulation between the coils of a stator slot.

16 Claims, 11 Drawing Sheets

(51) Int. Cl.
*H02K 3/12* (2006.01)
*H02K 3/34* (2006.01)
*H02K 9/06* (2006.01)
*H02K 15/085* (2006.01)
*H02K 15/10* (2006.01)

(52) U.S. Cl.
CPC ............ *H02K 9/06* (2013.01); *H02K 15/085* (2013.01); *H02K 15/10* (2013.01)

(56) References Cited

U.S. PATENT DOCUMENTS

| | | | |
|---|---|---|---|
| 4,160,926 A * | 7/1979 | Cope | .............. H02K 3/345 174/110 N |
| 5,561,334 A | 10/1996 | Ishida et al. | |
| 7,157,818 B2 | 1/2007 | Jones | |
| 2011/0148244 A1 * | 6/2011 | Bliemeister | .............. H02K 9/00 310/215 |

FOREIGN PATENT DOCUMENTS

| | | | |
|---|---|---|---|
| GB | 0 778 138 A | | 7/1957 |
| GB | 778138 A | * | 7/1957 |
| GB | 2 310 766 A | | 9/1997 |
| JP | S54-142503 A | | 11/1979 |
| JP | S57-153542 A | | 9/1982 |
| JP | H01-129735 A | | 5/1989 |
| JP | 2001-211593 A | | 8/2001 |
| JP | 2003-333786 A | | 11/2003 |

OTHER PUBLICATIONS

Search Report for GB Application No. 1705833.0 dated Oct. 26, 2017, 4 pages.

* cited by examiner

STATOR WITH EXTENDED INSULATOR FOR ELECTRIC MACHINE

RELATED APPLICATIONS

This application is a national stage filing of PCT Application No. PCT/GB2018/050949, filed on Apr. 10, 2018, which claims priority to and the benefit of United Kingdom patent application No. 1705833.0, filed on Apr. 11, 2017. The entire contents of these applications are incorporated by reference herein.

TECHNICAL FIELD

The present invention relates to a stator for a rotating electrical machine, and in particular a stator which can improve cooling of the machine.

BACKGROUND

Rotating electrical machines, such as motors and generators, generally comprise a rotor mounted on a shaft and arranged to rotate inside a stator. The rotor comprises a rotor core which holds rotor windings or permanent magnets. The rotor windings or permanent magnets produce a rotating magnetic field which crosses an air gap between the rotor and the stator. The stator comprises a stator core which holds stator windings which combine with the rotating magnetic field.

The stator of an electrical machine usually comprises slots which accommodate the stator windings. The windings may be wound in the slots in situ, or else pre-formed coils may be inserted into the slots. In either case, it is necessary for the windings to exit one slot and pass around the outside of the stator before entering another slot. The parts of the windings which extend outside of the stator are usually referred to as end windings or overhang windings.

In a multi-phase electrical machine, the stator windings include separate windings for each phase. This may result in the end windings of different phases lying adjacent to each other. In operation, each of the phases is at a different electrical potential.

In a rotating electrical machine the stator normally acts as the armature and carries the main electrical power. Since the end windings of different phases may lie adjacent to each other, considerable electrical potential may be present between the phases. It is therefore necessary to ensure sufficient electrical insulation between the end windings of different phases.

The individual wires in the stator windings are usually electrically insulated by means of an outer insulation layer, which is typically enamel. However faults may develop in the outer insulation layer either due to the manufacturing process, or due to stresses imposed on the wires during construction or use of an insertion tool. In the case of windings at different electrical potentials, this could lead to arcing between the windings. This would make the machine inefficient and could lead to the machine being damaged and ultimately machine failure.

Previous attempts at electrically insulating end windings of different phases have involved inserting insulating barriers, such as composite sheets of meta-aramid material and/or polyester, between the end windings.

The power rating of an electrical machine is often limited by the temperature rise of the stator and rotor when the machine is in use. Furthermore, machines generally operate more efficiently at lower temperatures. In addition, the machine lifespan may be reduced if the machine is operated at high temperatures. Thus many machines are arranged to have air flow through the machine, in order to cool the machine.

However, standard manufacturing processes typically result in end windings with few if any air gaps between the windings. If insulating paper is placed between the windings, this may also restrict the air flow through the windings and thus reduce the cooling efficiency. The non-uniform presence of resin in the end windings may further reduce the consistency and efficacy of any air flow gaps. Lacing string or cording which is used to hold the windings in place may further restrict airflow.

WO 2015/011492 in the name of the present applicant, the subject matter of which is incorporated herein by reference, discloses a separator for electrically separating groups of end windings in the stator of a rotating electrical machine. The separator is arranged to provide circumferential air channels through the end windings. This can allow airflow to be delivered between different groups of windings, thereby cooling the windings more effectively.

The separator disclosed in WO 2015/011492 can help to improve airflow through the end windings. However it has been found that airflow may still be restricted, in particular near the stator core. Furthermore, it may not always be practical to include such a separator in certain types of machines, particularly smaller machines where space is at a premium. It would therefore be desirable to provide further improvements in air flow and thermal management within electrical machines.

SUMMARY

One embodiment relates to a stator for a rotating electrical machine. The stator includes a plurality of stator slots each of which accommodates at least two coils of stator windings. The coils are arranged such that radial air gaps are present between the coils of adjacent stator slots as the coils extend out of the stator slots. Insulating means are provided between the coils of a stator slot as the coils extend out of the stator slot. The radial air gaps are defined between the insulating means of the coils of adjacent stator slots, and the insulating means are extended middle shoes which extend out of the stator slots.

Another embodiment relates to a rotating electrical machine that includes a stator, a rotor, and a fan arranged to provide air flow through the machine. The stator includes a plurality of stator slots each of which accommodates at least two coils of stator windings. The coils are arranged such that radial air gaps are present between the coils of adjacent stator slots as the coils extend out of the stator slots. Insulating means are provided between the coils of a stator slot as the coils extend out of the stator slot. The radial air gaps are defined between the insulating means of the coils of adjacent stator slots, the insulating means are extended middle shoes which extend out of the stator slots, and the air gaps between adjacent coils allow air to flow in a substantially radial direction through the air gaps.

Another embodiment relates to a method of assembling a stator for a rotating electrical machine that includes a plurality of stator slots each of which accommodates a plurality of coils of stator windings. The method includes inserting the coils into the stator slots such that radial air gaps are present between the coils of adjacent stator slots as the coils extend out of the stator slots, and inserting insulating means between the coils of a stator such that the radial air gaps are defined between the insulating means of the coils of adjacent stator slots. The insulating means are extended middle shoes which extend out of the stator slots.

DETAILED DESCRIPTION

Figure 1:
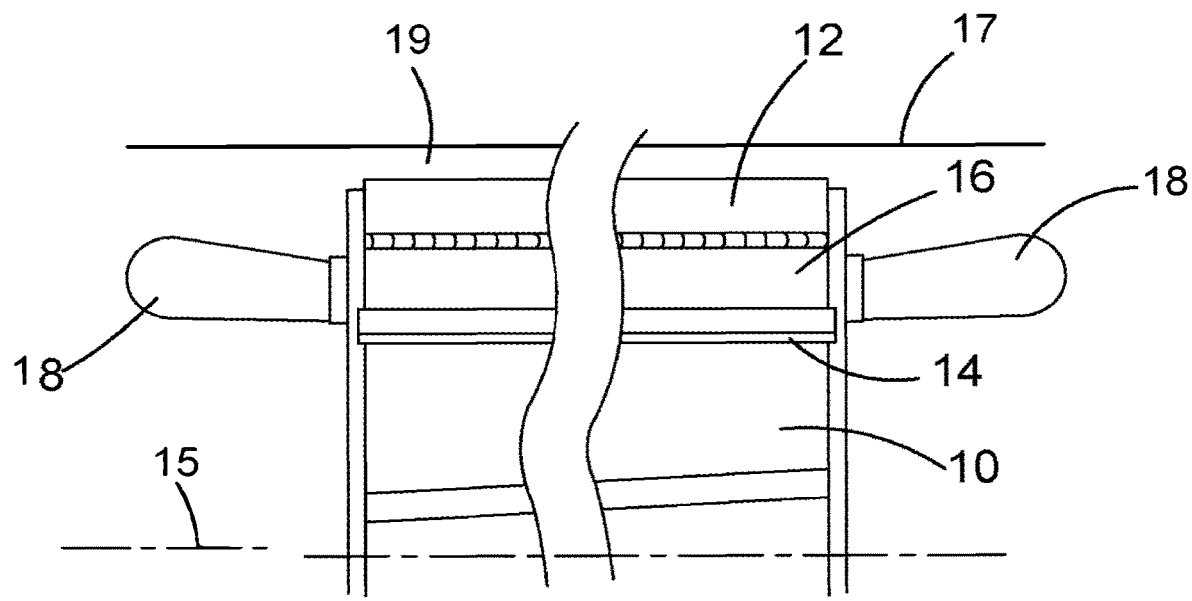
FIG. 1 is a radial cross section through part of a rotating electrical machine.

Preferred embodiments will now be described, purely by way of example, with reference to the accompanying drawings, in which:

According to a first aspect, there is provided a stator for a rotating electrical machine, the stator comprising a plurality of stator slots each of which accommodates at least one coil of stator windings, wherein radial air gaps are present between the coils of adjacent stator slots as the coils extend out of the stator slots.

In some embodiments, by providing radial air gaps between the coils of adjacent stator slots as the coils extend out of the stator slots, new air passages may be formed through the windings. This may improve air flow through the machine, thereby improving thermal management.

In some embodiments, each coil extends in a substantially axial direction for a predetermined distance from a stator slot. This may allow radial air gaps to be defined between the coils of adjacent stator slots. The length of the predetermined distance will typically depend upon the size of the machine, but should be sufficient to ensure that air gaps are present in the completed machine. For example, in some embodiments the predetermined distance may be at least 10 mm, at least 20 mm, at least 40 mm, or at least 60 mm, although other values could be used instead.

In some embodiments, each coil extends in a substantially circumferential direction in an area beyond the predetermined distance from a stator slot. For example, each coil may bend through an angle of approximately 90° in an area around the predetermined distance from a stator slot. This can allow the coils to pass around the outside of the stator between two stator slots.

In some embodiments, the stator is concentric wound. Thus at least some of the coils of a particular phase and/or pole may be concentric in, for example, directions which are substantially axial and/or circumferential. This may facilitate the provision of radial air gaps between the coils of adjacent stator slots.

However in other configurations the stator may be lap wound, or have some other winding configuration.

In some embodiments, each stator slot accommodates a plurality of coils. For example, the winding may be double layer, triple layer, or have any other number of layers. Alternatively the coils may be single layer.

The coils of a stator slot are typically at different electrical potentials when the machine is in use. For example, in a multiphase electrical machine, the coils of a stator slot may carry different phases.

In some embodiments, insulating means are provided between the coils of a stator slot as the coils extend out of the stator slot. The insulating means can allow electrical separation to be achieved between the coils of a slot in an area outside of the stator slots.

The insulating means can provide an electrically insulating layer between coils at different electrical potentials. For example, the electrical machine may be a multiphase electrical machine, and the insulating means may provide an electrically insulating layer between different phases.

Where multiple layers of coils are used, insulating means may be provided between each layer. Thus for example two or more insulating means may be provided for each stator slot.

In some embodiments, the radial air gaps are defined between the insulating means of the coils of adjacent stator slots. In order to help achieve this, the insulating means may at least partially wrap around a coil as the coil extends out of a stator slot. For example, the insulating means may extend partially but not fully around the circumference of the coil.

For ease of assembly the insulating means may at least partially wrap around the coil which is first inserted into the slot, which is typically the radially outwards coil of a slot. However the insulating means may as well or instead wrap around at least part of one other coil of the slot, for example the or a radially inwards coil.

The insulating means have a cross-section which is substantially U-shaped. For example, at least part of the insulating means may have an axial cross-section which is substantially U-shaped. This may help to wrap the insulating means around the coils, and thus may help to ensure that radial air paths are defined between the coils. However other configurations such as an S-shaped configuration are also possible. The insulating means may be pre-formed into the required shape, or else bent into shape during assembly.

In some embodiments, the insulating means extend in a substantially axial direction for a predetermined distance from a stator slot. For example, the insulating means may extend in a substantially axial direction until the inner coil of a concentric group of coils starts to bend in the circumferential direction. This can allow air gaps to be defined between adjacent coils, while avoiding the need for the insulating means to bend though an angle, which may facilitate assembly. The length of the predetermined distance will typically depend upon the size of the machine, but may be, for example, at least 10 mm, at least 20 mm, at least 40 mm, or at least 60 mm, although other values could be used instead.

The stator may further comprise a phase separator for providing an electrically insulating layer between groups of stator windings. The phase separator is typically located in the end windings. The phase separator may provide an electrically insulating layer between groups of stator windings at different electrical potentials, such as windings of different phases. The phase separator may be, for example, a composite sheet of meta-aramid material and/or polyester, or a separator such as that disclosed in WO 2015/011492 or EP 1865588 A1, the contents of which are incorporated herein by reference.

In some embodiments, the phase separator is located in an area where insulating means are not present. Thus the phase separator may be shorter in the axial direction than would otherwise have been the case of a machine of the same size without the insulating means. This may allow electrical separation to be achieved between groups of windings in those parts of the windings where no insulating means is provided.

For example, the phase separator may be located in an area where the coils extend in a substantially circumferential direction. However the phase separator is preferably not present in an area where air gaps are present between the coils of adjacent stator slots.

In some embodiments, the insulating means comprise a flexible insulating material, such as flexible insulating paper. For example, the insulating means may comprise a composite sheet of meta-aramid material and/or polyester, or any other suitable material.

In some embodiments, the insulating means are extended middle shoes which extend out of stator slots. This can provide a simple and efficient way of allowing radial air gaps to be present between the coils of adjacent stator slots, while also providing electrical insulation between the coils of the same stator slot, outside of the stator slot. Thus this arrangement can allow the invention to be implemented with minimal complexity and at low cost.

In some embodiments, the middle shoes have sides which are arranged to at least partially wrap around a coil as the coil extends out of a stator slot. This can help to ensure that radial air gaps are present between the coils of adjacent stator slots, while ensuring that sufficient electrical insulation is present between the coils of the same stator slot. For ease of assembly, the middle shoe may at least partially wrap the radially outwards coil of a slot. However the middle shoe may instead at least partially wrap around the radially inwards coil, or both.

The sides of the middle shoes may have the same height outside of the slots as inside, or they may have different heights outside of the slots. For example, the sides of the middle shoes may have heights which reduce as the middle shoes extend away from the stator slots. This may help to prevent the sides of the middle shoes from drooping into the air gaps. The reduction in height could be done gradually or in steps. Alternatively, the sides of the middle shoes could have a reduced height (compared to inside the slots) for their whole length outside of the slots.

Where multiple layers of coils are provided in the stator slots, two or more middle shoes may be provided. In this case each middle shoe may partially wrap around the radially outwards coil of the two coils which it separates, or the radially inwards coil, or both.

In another embodiment, the insulating means are part of a separate insulating component. In this case the insulating component may comprise a plurality of U-shaped members. Each U-shaped member may be provided between the coils of a stator slot as the coils extend out of the stator slot. For example, each U-shaped member may be arranged to partially surround a coil as it extends out of a stator slot. An air gap can be provided between adjacent U-shaped members in a circumferential direction. The air gap may at least partially define the radial air gap between the coils of adjacent stator slots.

Thus, this embodiment can allow radial air gaps to be present between the coils of adjacent stator slots, while also providing electrical insulation between the coils of the same stator slot, outside of the stator slot. Use of U-shaped members may also help to ensure that the insulating component is correctly located with respect to the coils.

The insulating component may comprise at least one ring on which the U-shaped members are mounted. This may facilitate assembly of the stator.

The insulating component may comprise a plurality of wedge-shaped members. In this case, each wedge-shaped member may be located between two coils of a stator slot, and an air gap may be provided between adjacent wedge-shaped members. This may help to ensure sufficient electrical insulation between the two coils, while allowing radial air flow between the coils of adjacent stator slots.

The wedge-shaped members may be arranged to increase the distance between the coils as the coils extend out of a stator slot. Each wedge-shaped member can comprise an inner layer and an outer layer, and a distance between the inner layer and the outer layer increases with distance from the stator slot. This may allow axial airflow between two layers of windings, as well as radial airflow between the coils of adjacent stator slots, and thus may help to improve the overall cooling of the machine.

Where U-shaped members are also provided, the wedge-shaped members may be co-located circumferentially with the U-shaped members. In this case the wedge-shaped members may extend axially from the U-shaped members. This may help to ensure correct location of the wedge-shaped members, as well as providing electrical insulation and allowing radial air flow between the coils of adjacent stator slots.

In any of the configurations described above, the stator may further comprise lacing for securing the coils, and the lacing may be located in area away from an area where air gaps are present between the coils of adjacent stator slots. This may help to prevent the lacing from obscuring the air gaps.

In any of the configurations described above, the stator slots may have slot liners, and the slot liners may be arranged without a cuff. For example, the cuff which might otherwise have been present may be cut off. This can help to ensure that the air gaps are not obscured by the slot liners.

According to another aspect, there is provided a rotating electrical machine comprising a stator in any of the forms described above, the machine further comprising a fan for providing air flow through the machine.

The air gaps between adjacent coils can allow air to flow in a substantially radial direction through the air gaps and then in a substantially axial direction towards the fan.

The machine may further comprise a rotor, the rotor comprising rotor end windings, and the air gaps between adjacent coils may allow air to flow in a substantially radial direction through the air gaps towards the rotor end windings.

The machine may further comprise a baffle for directing air flow through the machine from a substantially axial direction to a substantially radial direction. The baffle may be, for example, an annular disc shaped member located radially outwards of the stator end windings.

The baffle may comprise a deflector plate which is located radially outwards of the air gaps between the coils of adjacent stator slots. The deflector plate may be arranged at an angle relative to the axis of the machine. This may allow airflow coming from an air gap between the stator and the stator frame to be turned from a substantially axial direction to a substantially radial direction towards the air gaps between adjacent coils. By providing airflow in a substantially radial direction, the airflow may pass through the stator windings and impinge on the rotor end windings, thereby cooling both the stator windings and the rotor windings. Furthermore, it has been found that turning the airflow in this way may improve the airflow into the fan, resulting in less turbulence and thus more efficient operation.

According to another aspect, there is provided a method of cooling a rotating electrical machine, the machine comprising a stator, the stator comprising a plurality of stator slots each of which accommodates at least one coil of stator windings, the method comprising providing air flow through radial air gaps between the coils of adjacent stator slots.

According to another aspect, there is provided a method of assembling a stator for a rotating electrical machine, the stator comprising a plurality of stator slots each of which accommodates a plurality of coils of stator windings, the method comprising: inserting the coils into the stator slots such that radial air gaps are present between the coils of adjacent stator slots as the coils extend out of the stator slots; and inserting insulating means between the coils of a stator such that the radial air gaps are defined between the insulating means of the coils of adjacent stator slots.

Features of one aspect may be provided with any other aspect. Apparatus features may be provided with method aspects and vice versa.

In the present disclosure, terms such as "radially", "axially" and "circumferentially" are generally defined with reference to the axis of rotation of the rotating electrical machine unless the context implies otherwise.

FIG. 1 is a radial cross section through part of a rotating electrical machine. Referring to FIG. 1, the machine comprises a rotor 10 located inside a stator 12 with an air gap 14 between the two. The rotor 10 is mounted on a shaft with an axis of rotation indicated by the dashed line 15. The stator 12 comprises a stator core 16 with slots on its inner circumference in which are wound stator windings. The stator windings run through the slots in a substantially axial direction. End windings 18 extend out of the stator slots and around the outside of the stator core in a substantially circumferential direction. The stator is contained within a stator frame 17. An annular air gap 19 is provided between the stator core 16 and the stator frame 17. Typically, a fan (not shown in FIG. 1) is located at the drive end of the machine, in order to draw cooling air through the machine.

Figure 2:
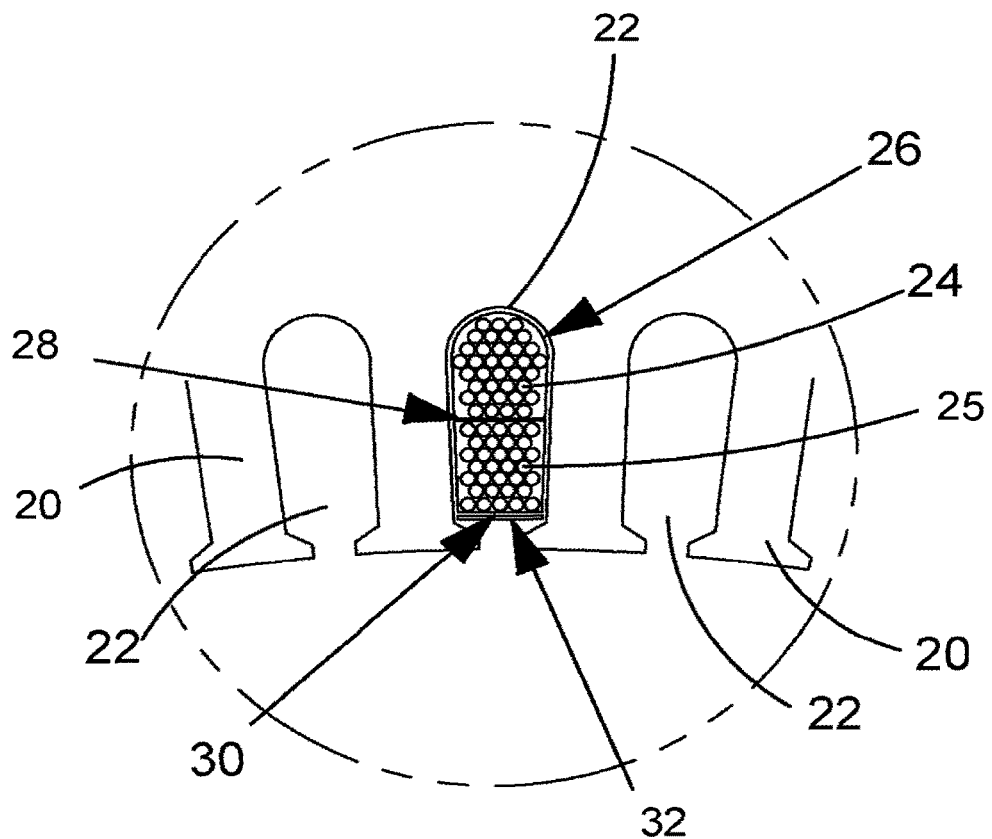
FIG. 2 is an axial cross section through part of a stator.

FIG. 2 is an axial cross section through part of a stator. Referring to FIG. 2, the stator comprises a plurality of teeth 20 which define slots 22. In FIG. 2 the centre slot is shown with stator windings in place. In this example double layer windings are used, with a first coil 24 of stator windings located on the inner side of the slot and a second coil 25 of stator windings located on the outer side of the slot.

In the arrangement of FIG. 2, a slot liner 26 is located between the stator windings 24, 25 and the inside of the slot 22. The slot liner prevents the windings from coming into direct contact with the core, and provides electrical separation between the windings and the core. A middle shoe or phase separator 28 is located between the inner coil and the outer coil. The middle shoe has a U-shaped cross section, and extends around at least part of one of the coils. The middle shoe 28 is used to provide electrical separation between the two coils, which usually belong to different phases and thus will be at different electrical potentials. A top shoe 30 provides electrical separation between the windings and the air gap. In addition, slot packers 32 may be provided to help hold the winding in place.

Figure 3:
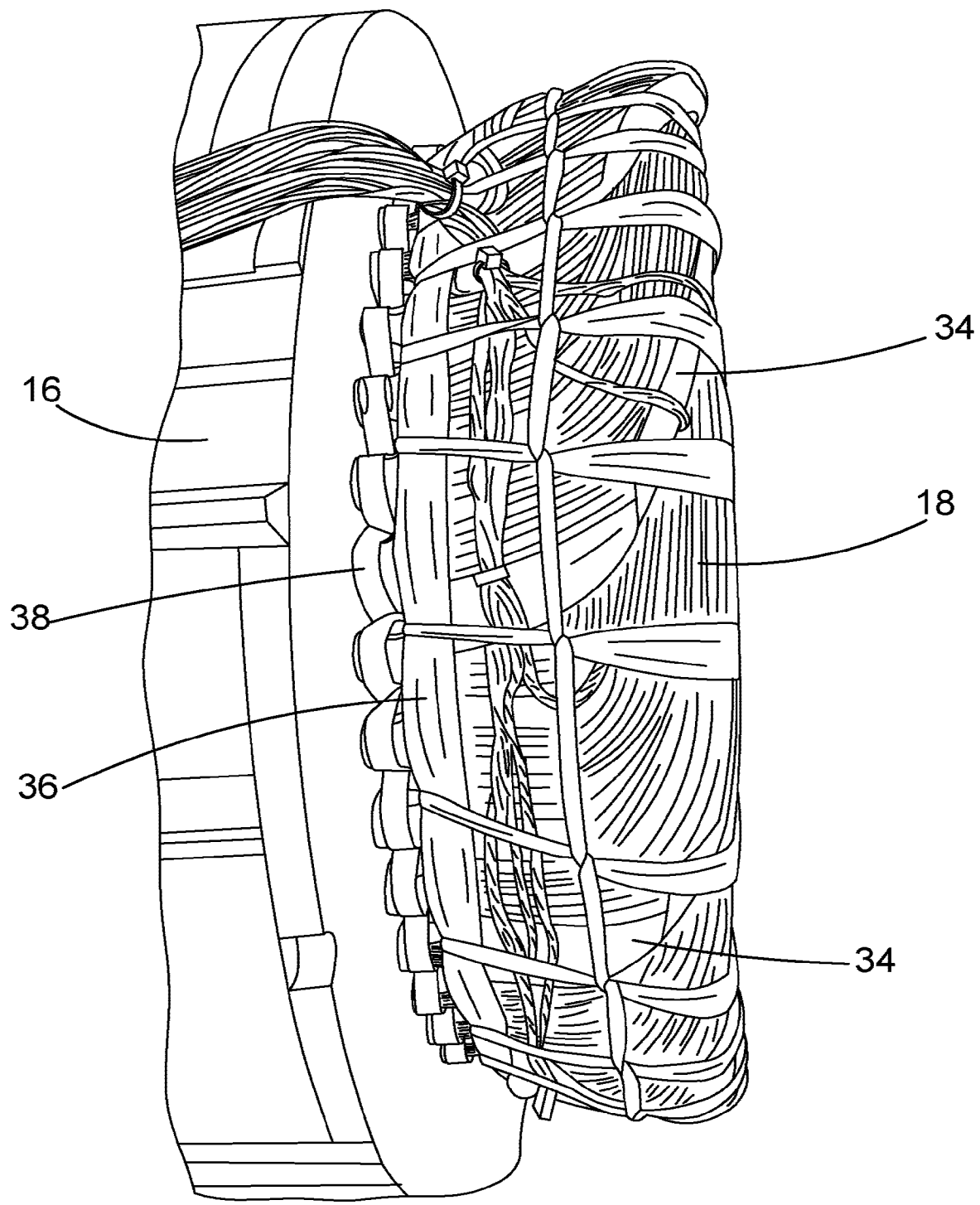
FIG. 3 shows parts of a stator with an existing end winding design.

FIG. 3 shows parts of a stator with an existing end winding design. Referring to FIG. 3, the stator comprises stator core 16 with stator slots running in a substantially axial direction through the stator core. End windings 18 extend out of the stator slots and around the outside of the stator core. The stator windings are arranged in groups, with a group of windings provided for each phase and each pole. Phase separators 34 are provided between respective groups of ends windings. The phase separators 34 provide electrical separation between the phases. In this example the phase separators are composite sheets of meta-aramid material. The parts of the slot liners which extend outside of the stator slots are folded back to form cuffs 38.

The existing end winding design shown in FIG. 3 has a non-uniform array of predominantly blocked end-winding gaps at both ends of the machine. Typically, resin in the end windings blocks any air gaps which might otherwise be present. Furthermore, in order to ensure electrical separation between the phases, the phase separators 34 are inserted as far as possible into the end windings, and thus approach or come into contact with the stator core. This further reduces any air flow between the coils. The cuffs 38 on the slot liners may also restrict air flow. In addition, the lacing string 36 which is used to hold the end windings in place may block any air flow gaps which may be present.

In embodiments of the present invention, thermal improvements are obtained by modifications to airflow pathways near the end windings of an electrical machine.

Figure 4:
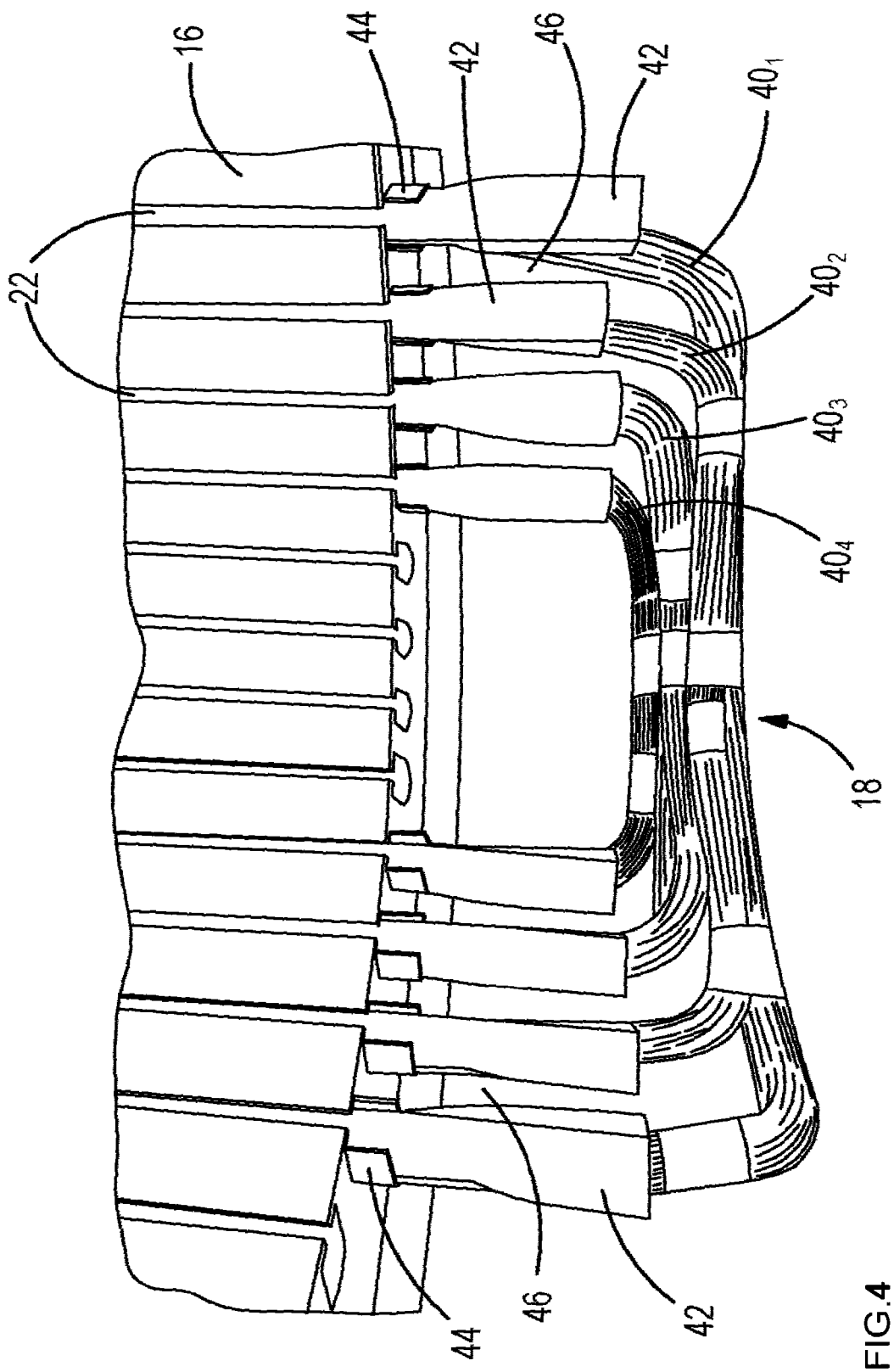
FIG. 4 shows parts of stator in an embodiment of the present invention.

FIG. 4 shows parts of stator in an embodiment of the present invention. Referring to FIG. 4, the machine comprises stator core 16 with stator slots 22 running in a substantially axial direction through the stator core. Stator windings are provided in the form of coils $40_1$-$40_4$.

In FIG. 4 the stator is shown in a partially wound state, with the four coils $40_1$-$40_4$ inserted on the inner sides of respective slots (i.e. radially outwards). In this example the four coils are concentric, with one coil located inside another in the axial and circumferential directions. The four coils carry one of the stator phases.

In the arrangement of FIG. 4, each coil $40_1$-$40_4$ exits a stator slot in a substantially axial direction, and continues to run in a substantially axial direction for a certain distance. The coil then bends through approximately 90°, and then runs in a substantially circumferential direction. Once the coil is approximately aligned circumferentially with its other stator slot, it bends back through 90° towards the stator core. The coil then runs in a substantially axial direction towards and into the other slot.

Since the coils are concentric, each extends out of the stator core by a different amount. However, even in the case of the inner coil $40_4$, the coil is allowed to run in a substantially axial direction for a certain distance before bending around into a substantially circumferential direction. In this example the distance between the end of the stator and the point at which the inner coil starts to bend through 90° is approximately 120 mm, although this will of course depend on the overall size of the machine.

Still referring to FIG. 4, it can be seen that the stator includes middle shoes 42 which extend out of the stator slots together with the coils. The middle shoes 42 have a substantially U-shaped cross-section when viewed axially, and thus wrap part of the way around the circumference of the coils. In the example shown, each middle shoe is located on the radially inward side of a coil, with sides that extend radially outwards around each side of the coil.

In order to complete winding of the machine, further coils are added on top of the coils $40_1$-$40_4$ (i.e. radially inwards of the coils $40_1$-$40_4$) and in the empty slots. The extended middle shoes 42 provide electrical insulation between the two coils of a stator slot as the coils extend radially outwards of the slot.

In the arrangement of FIG. 4 the middle shoes 42 extend axially outwards of the stator slots until approximately the point at which the inner coil $40_4$ begins to bend towards the circumferential direction. In addition, the slot liner cuff which would normally be present at the exit point of the slot is cut off, to leave a shortened slot liner rim 44.

It can be seen from FIG. 4 that air gaps 46 are provided between adjacent coils in a circumferential direction. The air gaps are achieved by virtue of the fact that the coils run in a substantially axial direction for a certain distance once they have left the stator slots, and by virtue of the extended middle shoes 42 which partially wrap around the coils. The extended middle shoes 42 allow electrical insulation to be achieved between radially inner and outer groups of windings, without the need for a phase separator to be inserted fully into the end windings. Thus the extended middle shoes may prevent the blocking of air gaps which occurred in previous end winding designs.

In the embodiment shown, the U-shaped cross section of each middle shoe 42 is pre-formed. The part of the middle shoe 42 which extends out of the slot has the same U-shaped cross section as the part which is inside the slot. However it would also be possible for the part of the middle shoe which is outside of the slot to have a different cross section from the part which is inside the slot. For example, the height of the sides of the middle shoe could be reduced as the middle shoe extends away from the stator core. Alternatively the sides of the middle shoes could have a reduced height outside of the slot compared to inside the slot, for the whole part of the middle shoe which is outside the slot.

Figure 5:
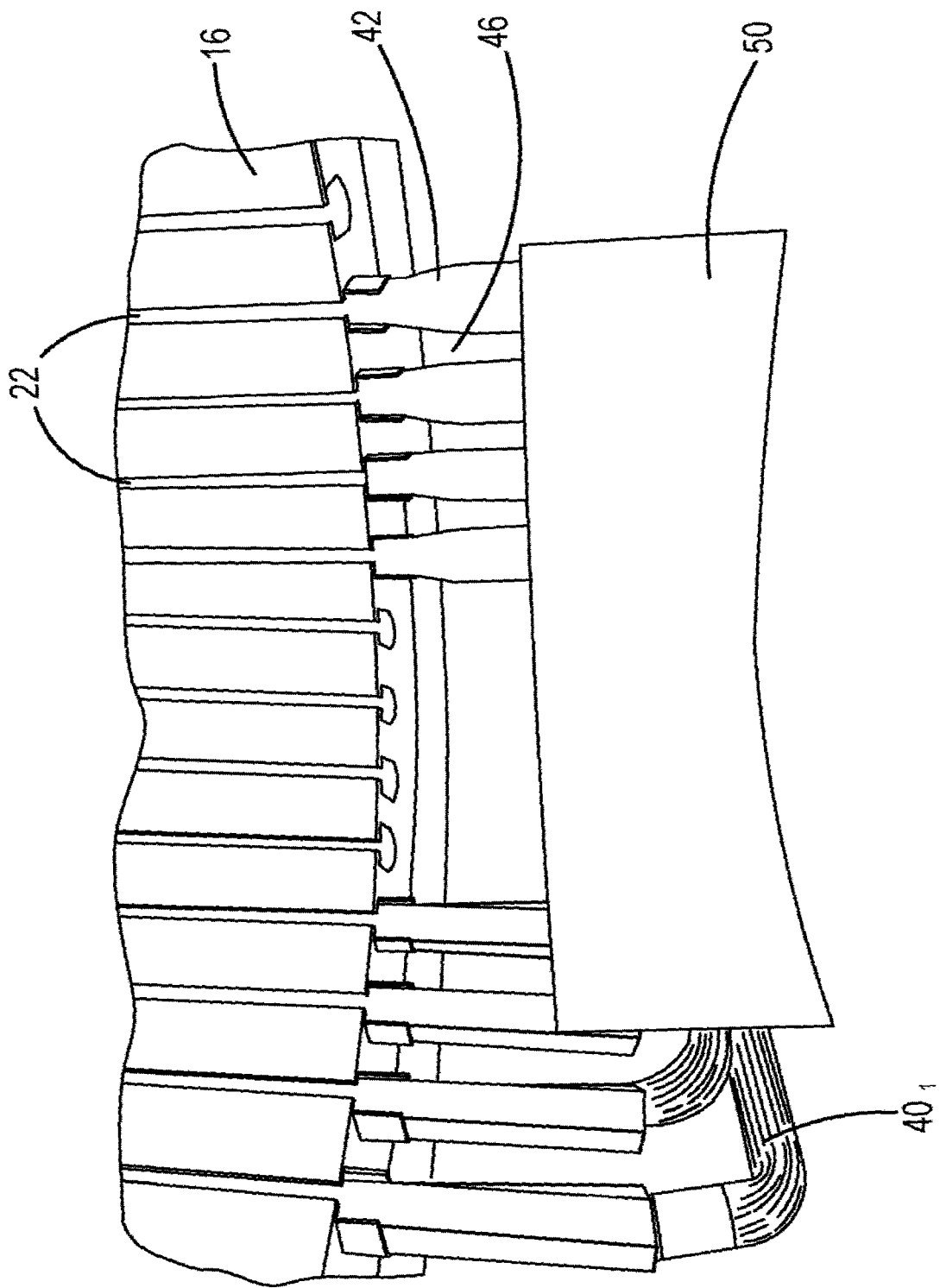
FIG. 5 shows the arrangement of FIG. 4, with a phase separator in place.

FIG. 5 shows the arrangement of FIG. 4, with a phase separator in place. Referring to FIG. 5, in contrast to the previously considered end winding design, in this arrangement the phase separator 50 is placed only over those parts of the end windings where no extended middle shoe is present. Thus in this example the phase separator is placed over the circumferential part of the end windings. The phase separator 50 of this design is therefore narrower in the axial direction than is the case in the previously considered design. As a consequence, the phase separator 50 does not block air gaps between the coils.

In the arrangement of FIG. 5 the phase separator 50 may be, for example, a composite sheet of meta-aramid material and/or polyester. Alternatively, a phase separator such as that disclosed in WO 2015/011492 or EP 1865588 A1 may be used instead.

Figure 6:
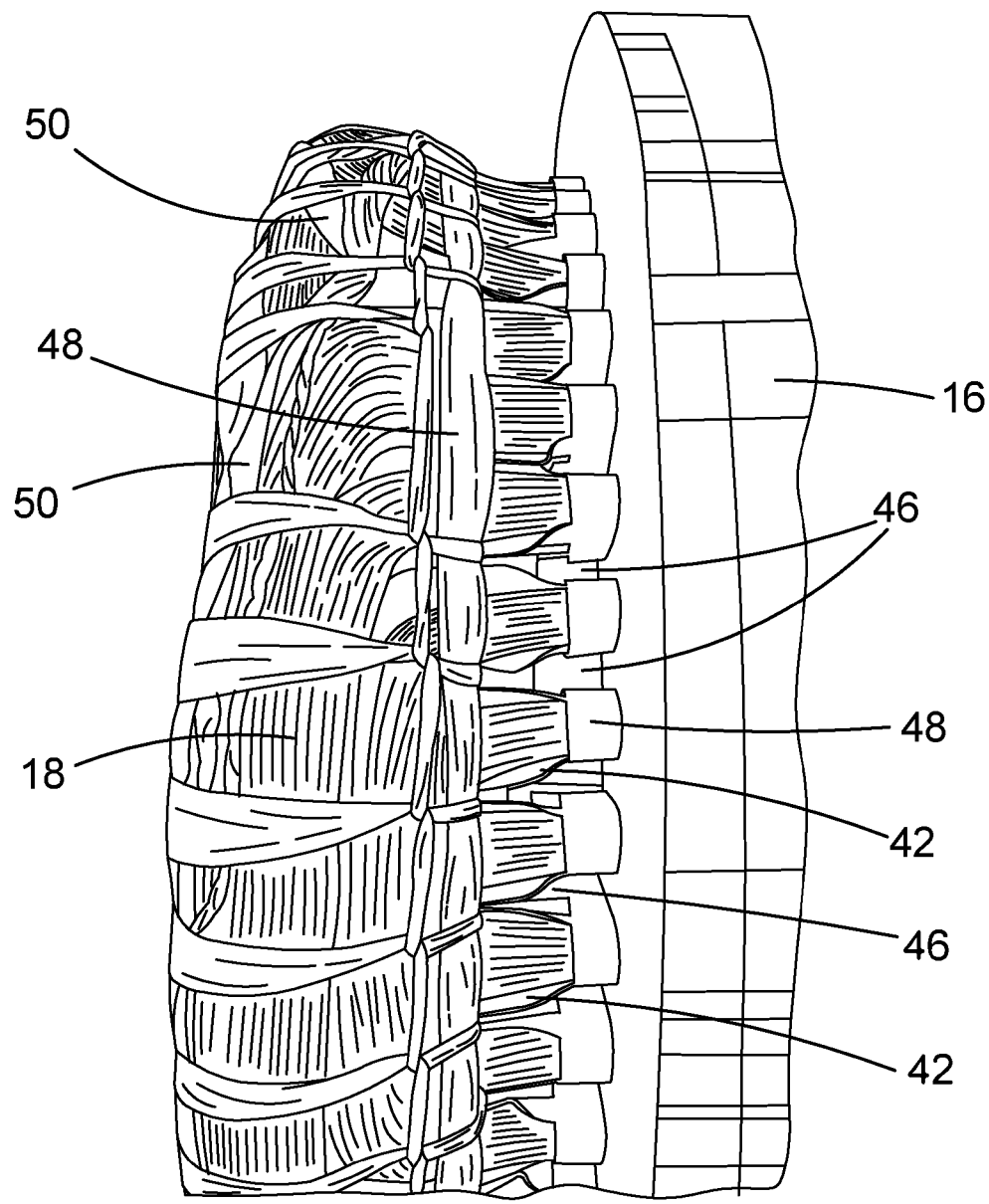
FIG. 6 shows part of a fully-wound stator in accordance with an embodiment of the invention.

FIG. 6 shows part of a fully-wound stator in accordance with an embodiment of the invention. Referring to FIG. 6, the stator comprises stator core 16, with end windings 18 extending out of the stator slots. The extended middle shoes 42 provide electrical insulation between the radially outward coils and the radially inward coils as they exit the stator slots. At the same time, by extending the middle shoes partially around the coils, air gaps 46 are achieved between adjacent coils as they exit the stator.

FIG. 6 also shows how the lacing string 48 which is used to hold the end windings is moved away from the stator, in order to prevent the lacing string from blocking the air gaps. Furthermore the shorted phase separators 50 are located in the circumferential parts of the end windings 18, and thus do not block the air gaps 46.

The modified end winding arrangements shown in FIGS. 4 to 6 can be used at the drive end of the machine, the non-drive end, or both.

Figure 7:
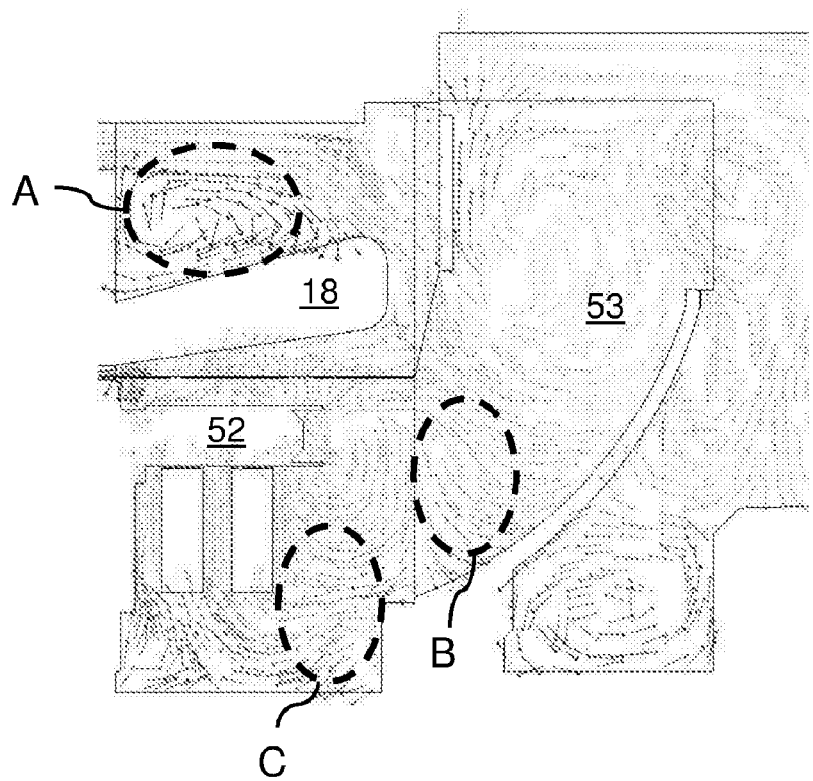
FIG. 7 shows air flow at the drive end of a machine with the existing end winding design.

FIG. 7 shows air flow at the drive end of a machine with the existing end winding design. The machine comprises a stator with stator end windings 18, a rotor with rotor end windings 52, and a fan 53. Referring to FIG. 7, it can be seen that very little air flow if any air flow is achieved through the stator end windings. Furthermore, various distinct flow patterns can be observed, as follows:

1) Eddy currents are formed in the void above the stator end windings. This is indicated by area A. The eddy currents lead to pressure loss, reducing the air flow velocity, and resulting in a reduction in the transfer of heat to the cooling air.

2) The airflow at the fan-inlet has a strong radial velocity component. This is indicated by area B. For ideal fan-inlet conditions, the predominant velocity component of airflow entering the fan-inlet should be axial.

3) The pumping effect from the rotor windings is creating a suction effect which is pulling airflow from the fan-inlet back in the machine. This is indicated by area C.

Figure 8:
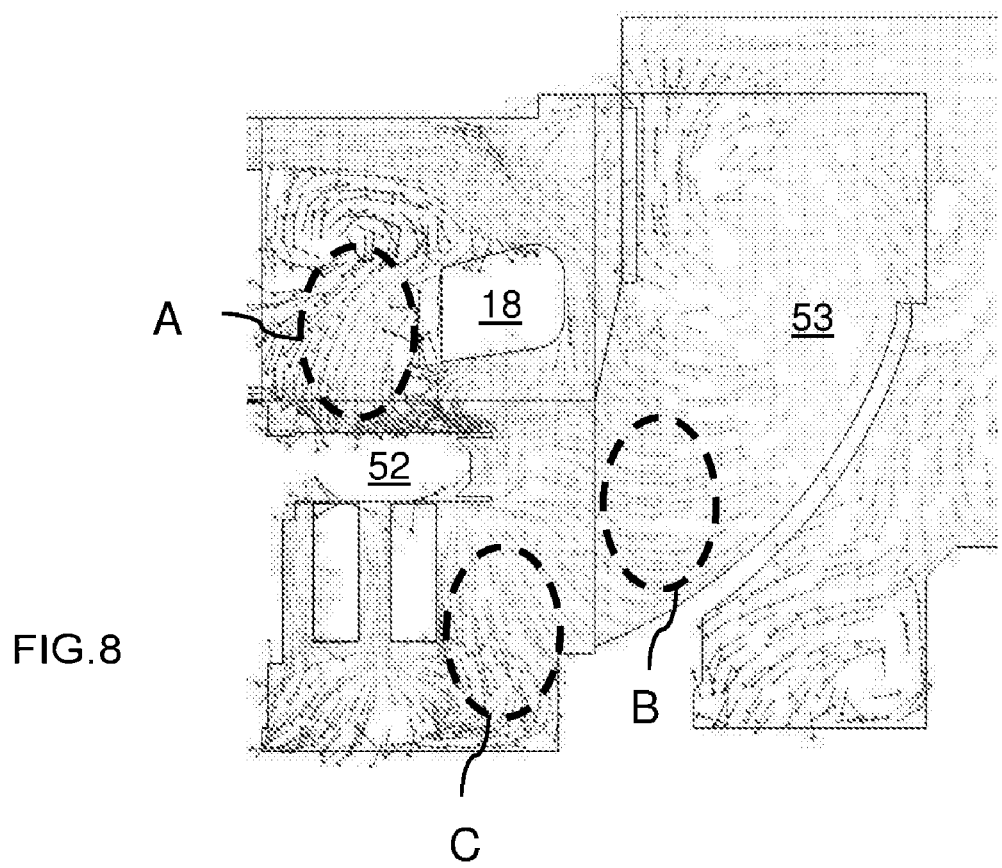
FIG. 8 shows air flow at the drive end of a stator with the end winding arrangement of FIGS. 4 to 6.

FIG. 8 shows air flow at the drive end of a stator with the end winding arrangement of FIGS. 4 to 6. Referring to FIG. 8, it can be seen that the modified end winding arrangement provides new passages which allows air to flow between the end windings. Furthermore, the following flow patterns can be observed:

1) Airflow through the stator end windings (area A) impinges on the rotor end windings, thereby cooling the rotor.

2) The airflow entering the fan (area B) has a predominant axial velocity component. This is in contrast to the highly radial velocity component observed in FIG. 7.

3) The unfavourable pumping from the rotor end windings and reverse-flow from the fan-inlet seen in FIG. 7 have virtually been eliminated (area C).

Tests carried out by the present applicant have found that the winding arrangement shown in FIGS. 4 to 6 can improve the machine's cooling on both the stator and rotor. The improved cooling leads to a better power density, which can be used as a cost saving or a power increase.

In another embodiment of the invention, rather than using extended middle shoes to provide electrical separation between different phases, a separate insulating component is provided for this purpose.

Figure 9:
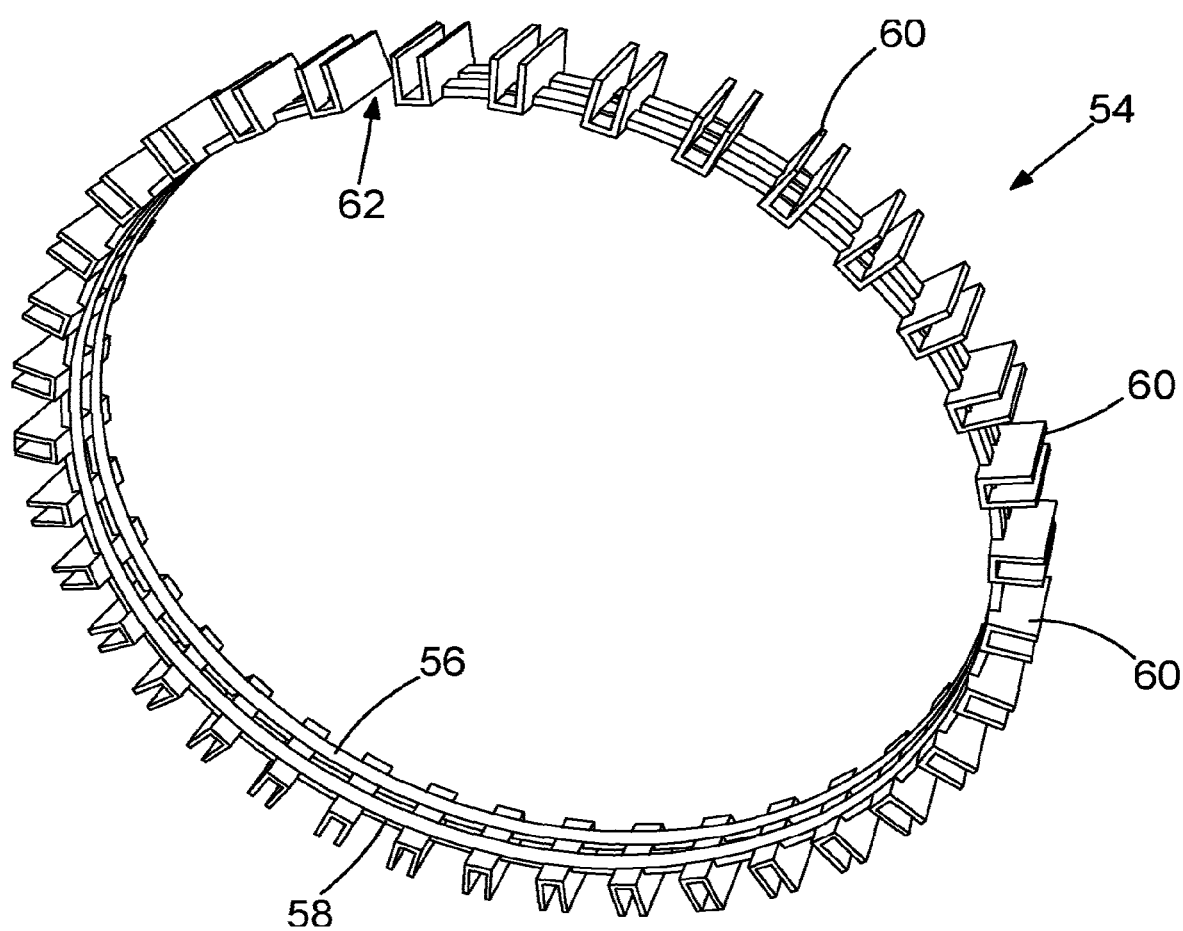
FIG. 9 shows an insulating component in accordance with another embodiment of the invention.

FIG. 9 shows an insulating component in accordance with this embodiment. Referring to FIG. 9, the insulating component 54 comprises two parallel inner rings 56, 58 or "railway tracks". A series of U-shaped insulating members 60 is provided at spaced locations around the outside of the rings 56, 58. The locations of the U-shaped insulating members 60 correspond to the locations of coils exiting stator slots. A gap 62 in the inner rings is provided between two of the insulating members. The gap allows the insulating component 54 to be opened up, and thus facilitates its fitting to an electrical machine. The insulating component 54 may be made of any suitable electrically insulating material such as a polyester.

In use, the insulating component 54 of FIG. 9 is fitted between the inner coils and the outer coils of the end windings. Thus the insulating component 54 can be used instead of the extended middle shoes 42 shown in FIGS. 4 and 5. The insulating component 54 allows electrical insulation to be achieved between adjacent groups of windings, without the need for a phase separator to be inserted fully into the end windings. However a phase separator may be used to provide electrical separation between those parts of the windings where the insulating component 54 is not present, in a similar way to that shown in FIG. 5.

In alternative arrangements, the U-shaped insulating members may be provided on the inside of the rings 56, 58 rather than the outside, or alternatively on both sides of the rings. Rather than two rings, a single ring, or more than two rings, could be used. Other configurations which allow electrical separation between the phases will be apparent to the skilled person.

In any of the embodiments described above, the machine may be provided with a baffle to help direct airflow within the machine. The baffle may be, for example, an annular disc located axially outwards of the end windings, and may be attached to the stator frame. Such a baffle may help to turn air flow coming from an air gap between the stator core and the stator frame from a substantially axial direction to a substantially radial direction through the air gaps between the coils. This may help to improve air flow through the machine.

Figure 10:
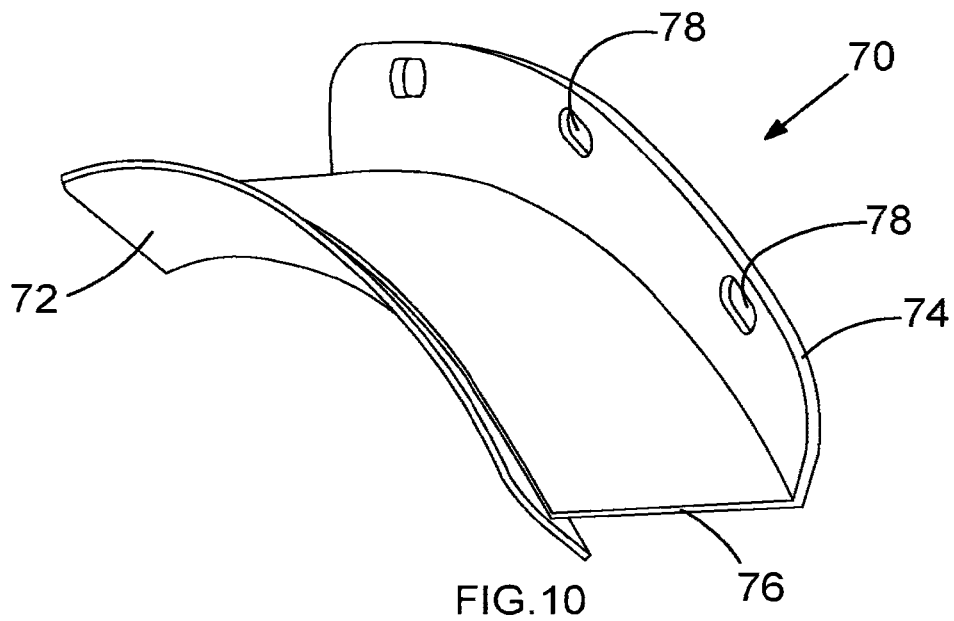
FIG. 10 shows part of a baffle for use with the end winding design in an embodiment of the invention.

FIG. 10 shows part of a baffle for use with an end winding design in an embodiment of the invention. Referring to FIG. 10, the baffle 70 comprises a deflector plate 72, an attachment member 74, and a connecting member 76. The deflector plate 72 is partially annular (an incomplete ring) and is angled relative to the axis of the machine. The deflector plate 72 is connected to the attachment member 74 by means of the connecting member 76. The attachment member 74 comprises a plurality of bolt holes 78 which are used to connect the baffle to the stator frame. In use, a plurality of baffles such as that shown in FIG. 10 are provided around the machine.

Figure 11:
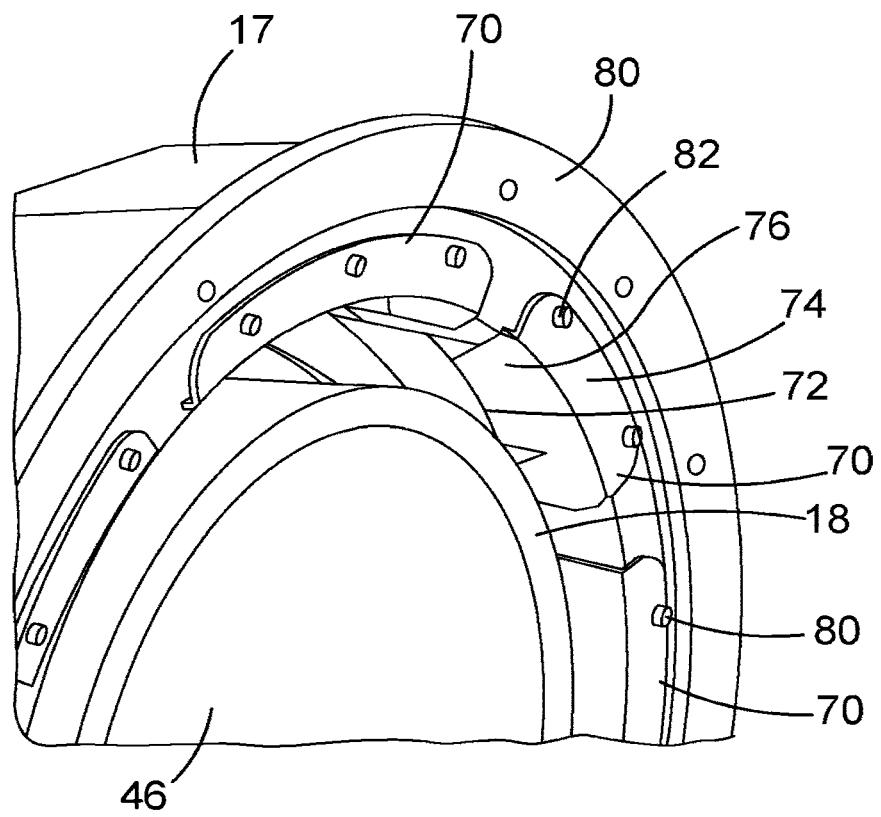
FIG. 11 shows part of a rotating electrical machine with baffles in place.

FIG. 11 shows part of a rotating electrical machine with the baffles in place. Referring to FIG. 11, each baffle 70 is connected to an end plate 80 of the stator frame 17 by means of bolts 82 which pass through the bolt holes in the attachment member 74. The connecting member 76 is used to extend the deflector plate 72 inside the machine, so that it is located radially outwards of the of air gaps 46 between the coils of adjacent stator slots. The deflector plate 72 is presented at an angle of approximately 45° to the axis of the machine.

Figure 12:
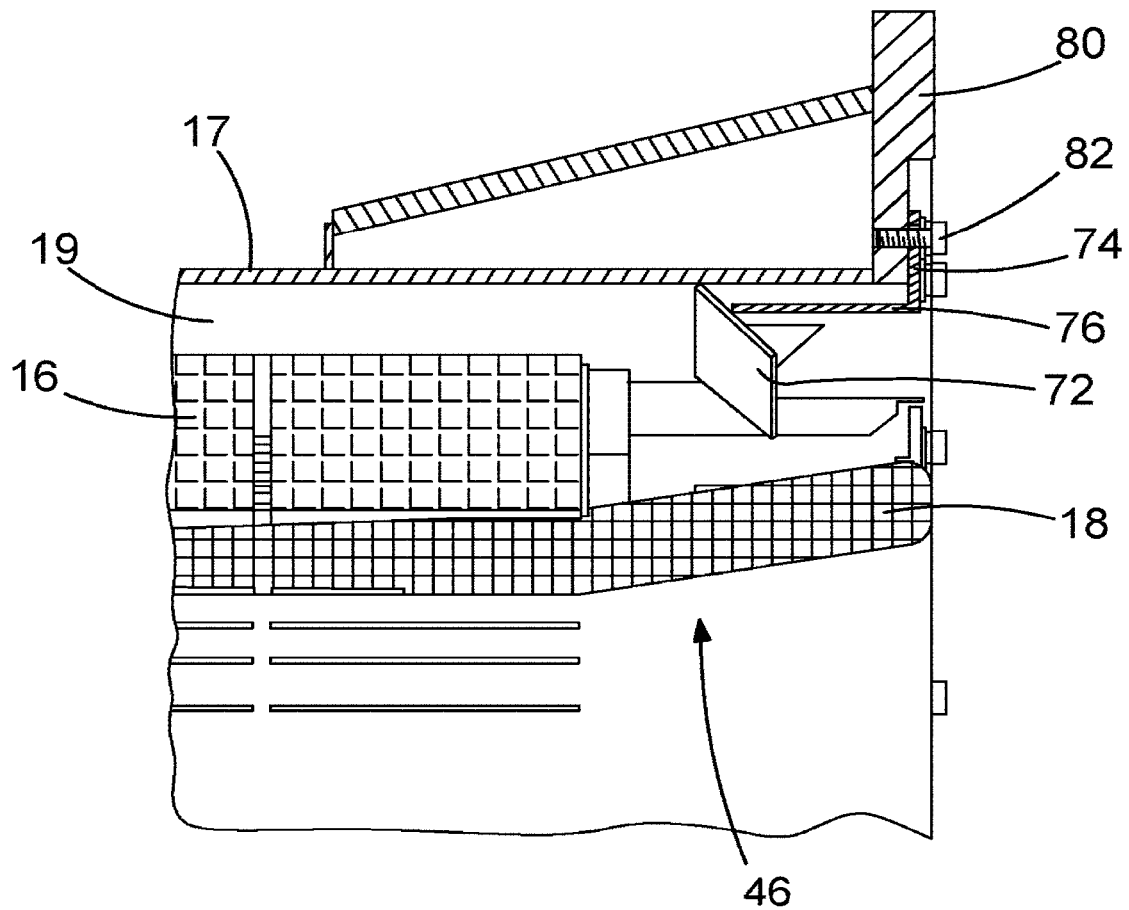
FIG. 12 shows a cross-section through part of a rotating electrical machine.

FIG. 12 shows a cross-section through part of a rotating electrical machine with a baffle in place. By locating the deflector plate 72 above the air gaps 46 and at an angle relative to the axis of the machine, the deflector plate can be used to turn air flow from the stator/frame air gap 19 from a substantially axial direction to a substantially radial direction towards the air gaps 46. This can help to ensure that air flows in a radial direction through the stator windings, and impinges on the rotor windings, as shown in FIG. 8.

It will be appreciated that any appropriate number of baffles may be provided, and that each baffle may extend through any appropriate angle circumferentially. Rather than a plurality of partially annular baffles, a single annular baffle could be used instead. Alternatively, an air flow baffle such as that disclosed in co-pending European patent application number 17151978.8 in the name of the present applicant, the subject matter of which is incorporated herein by reference, may be used.

In a further embodiment of the invention, an insulating component is provided which provides electrical separation between different phases, and which also displaces the coils in the end winding region radially. This can allow axial airflow between two-layered end windings, in addition to radial airflow between the coils.

Figure 13:
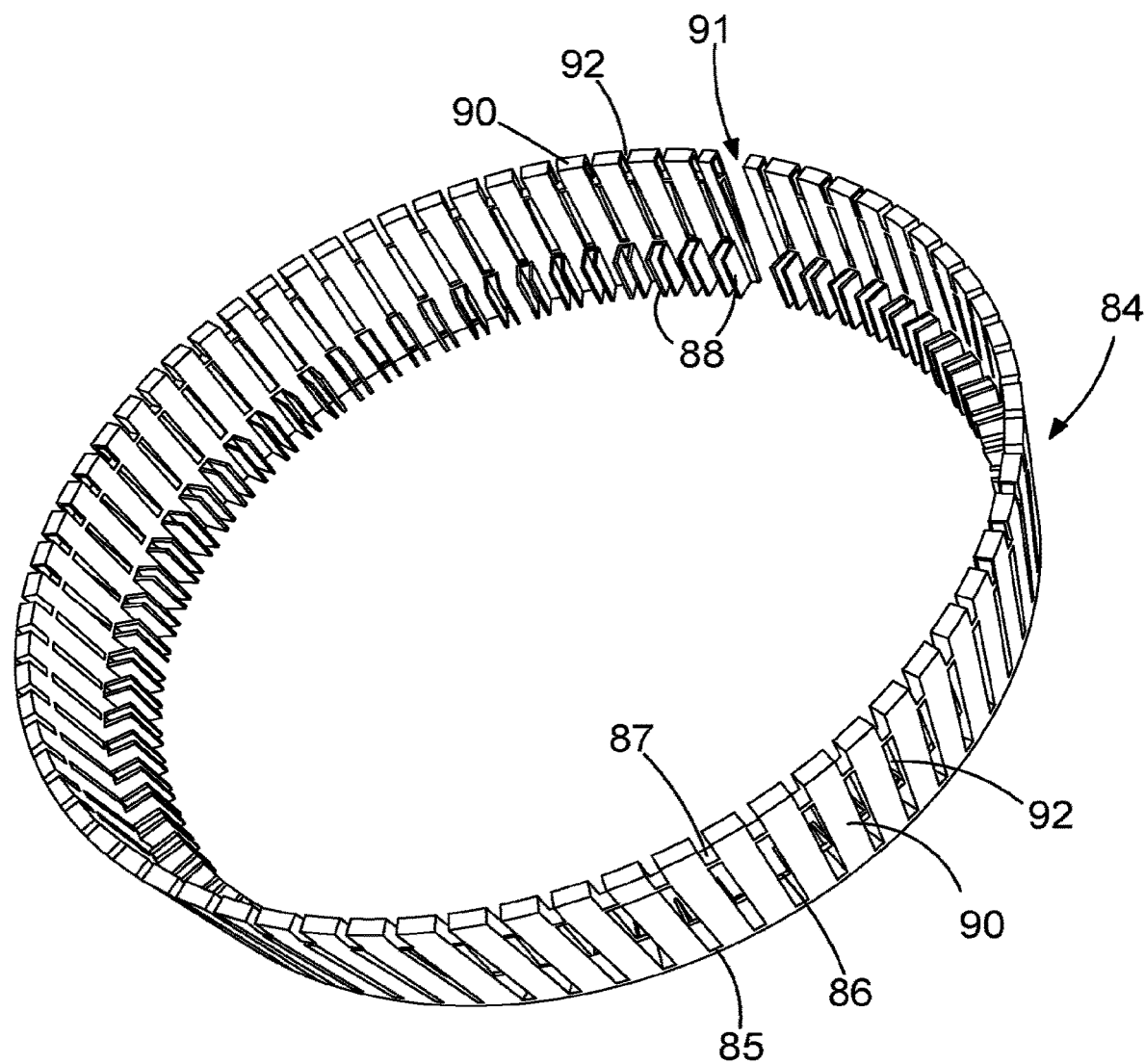
FIG. 13 shows an insulating component in accordance with another embodiment of the invention.

FIG. 13 shows an insulating component in accordance with this embodiment. Referring to FIG. 13, the insulating component 84 is annular in form, and comprises three parallel rings 85, 86, 87, a plurality of U-shaped insulating members 88, and a plurality of wedge-shaped members 90. A gap 91 in the insulating component 84 allows it to be opened up, and thus facilitates its fitting to an electrical machine. The insulating component 84 may be made of any suitable electrically insulating material such as a polyester.

In the arrangement of FIG. 13, the U-shaped members 88 and the wedge-shaped members 90 are provided at spaced locations around the insulating component. The wedge-shaped members 90 are co-located circumferentially with the U-shaped members 88. However, the wedge-shaped members 90 extend axially away from the U-shaped members 88. The wedge-shaped members 90 have a radial thickness which increases with distance from the U-shaped members 88. Air gaps 92 are provided between adjacent wedge-shaped members 90 in a circumferential direction. The locations of the U-shaped members 88 and the wedge-shaped members 90 correspond to the locations of coils exiting stator slots.

The U-shaped insulating members 88 of FIG. 13 are used to provide electrical insulation between adjacent groups of windings while allowing radial air flow between adjacent coils, in a similar way to the U-shaped insulating members 60 of FIG. 9. In addition, the wedge-shaped members 90 are used to displace radially the coils of the inner and outer windings relative to each other.

Figure 14:
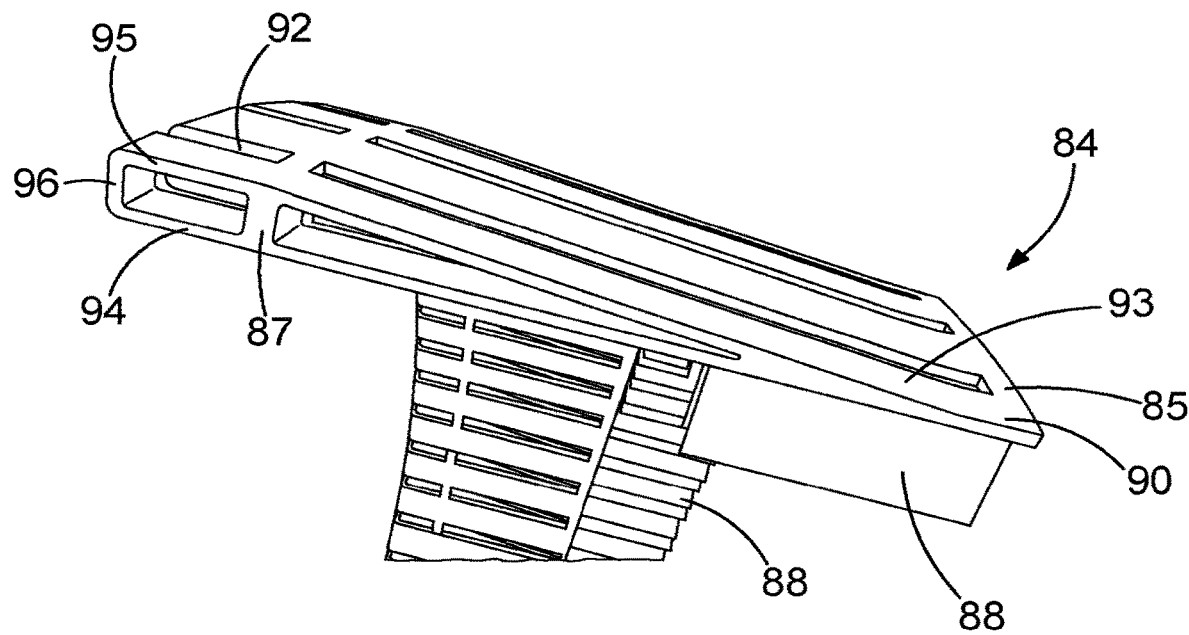
FIG. 14 shows a view taken through part of the insulating component of FIG. 13.

FIG. 14 shows a view taken through part of the insulating component 84. Referring to FIG. 14, each wedge-shaped member 90 is formed from a single layer of material 93 in an area where the wedge-shaped member is co-located with a U-shaped member. This single layer of material 93 also forms the bottom part of the "U" in the U-shaped member 88.

As the wedge-shaped member 90 extends axially away from the U-shaped member 88, it separates into a radially inside layer 94 and a radially outside layer 95. The distance between the inside layer 94 and the outside layer 95 increases with distance from the U-shaped member 88, until the inside layer 94 and the outside layer 95 meet the ring 87. The ring 87 is used to space the outside layer 95 radially apart from the inside layer 94, as well as to space apart adjacent wedge-shaped members 90. Beyond the ring, the inside layer 94 and the outside layer 95 extend substantially parallel to each other until they meet an end portion 96. The end portion 96 runs in a substantially radial direction, in order to space the outside layer 95 radially apart from the inside layer 94.

In use, the insulating component 84 of FIGS. 13 and 14 is fitted over the inner coils of the end windings, after the inner coils have been inserted but before the outer coils have been inserted. Thus, once the outer coils have been inserted, the insulating component 84 is located between the inner coils and the outer coils of the end windings.

Figure 15:
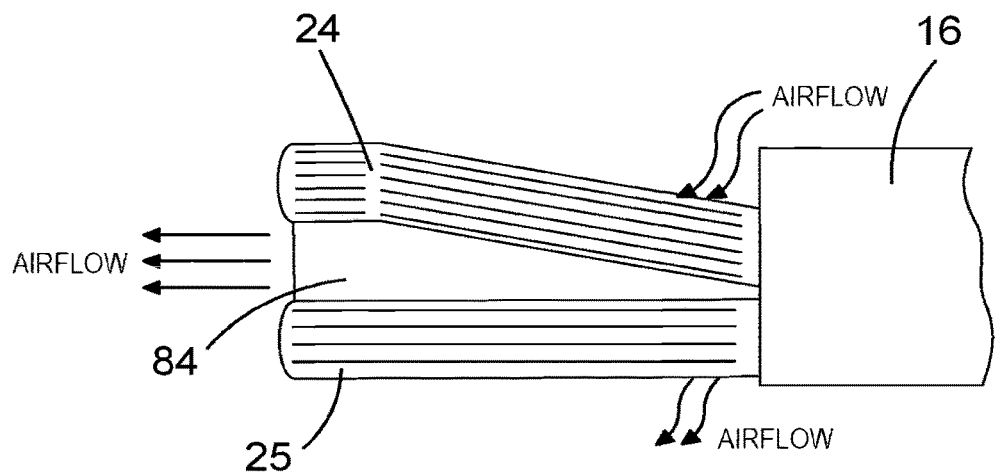
FIG. 15 illustrates air flows through the coils.

The insulating component 84 of FIGS. 13 and 14 allows electrical insulation to be achieved between the inner and outer coils of double layer windings, while also allowing radial airflow between the coils of adjacent slots. This is achieved by virtue of the U-shaped members 88. In addition, the wedge-shaped members 90 displace the inner and outer coils radially, which allows axial airflow between the inner and outer coils, in addition to the radial airflow between the coils. The air flows through the coils are illustrated in FIG. 15.

In alternative arrangements, the U-shaped members may extend radially outwards rather than radially inwards, or both radially outwards extending and radially inwards extending U-shaped members may be provided. Where three or more layers of windings are used, two or more insulating components may be used.

It will be appreciated that embodiments of the present invention have been described by way of example only, and variations in detail may be made within the scope of the appended claims. For example, the electrical machine may be single phase, 3-phase, or have any other number of phases. Different winding configurations may be used, such as lapped windings. Rather than double layer windings, single layer, triple layer, or any other number of layers, may be used instead. Other modifications in detail will be apparent to the skilled person.

The invention claimed is:

1. A stator for a rotating electrical machine, the stator comprising:
a plurality of stator slots each of which accommodates at least two coils of stator windings, wherein:
each coil extends in a substantially axial direction for a predetermined distance from a stator slot, and in a substantially circumferential direction in an area beyond the predetermined distance from the stator slot;
the coils are arranged such that radial air gaps are present between the coils of adjacent stator slots as the coils extend out of the stator slots;
insulators are provided between the coils of a stator slot as the coils extend out of the stator slot;
the insulators comprise extended middle shoes which extend out of the stator slots;
each middle shoe is located between an inner coil and an outer coil of a stator slot and provides electrical insulation between the inner coil and the outer coil;
each middle shoe extends out of the stator slots in a substantially axial direction until a point at which a coil begins to bend towards the circumferential direction; and
the radial air gaps are defined between the extended middle shoes of adjacent stator slots, the radial air gaps allowing air to flow through the stator windings in a radial direction between the coils of two adjacent stator slots.

2. A stator according to claim 1, wherein at least some of the coils are concentric.

3. A stator according to claim 1, wherein the extended middle shoes provide an electrically insulating layer between coils at different electrical potentials.

4. A stator according to claim 1, wherein the electrical machine is a multiphase electrical machine, and the extended middle shoes provide an electrically insulating layer between different phases.

5. A stator according to claim 1, wherein the extended middle shoes at least partially wrap around a coil as the coil extends out of a stator slot.

6. A stator according to claim 1, wherein the extended middle shoes have a cross-section which is substantially U-shaped.

7. A stator according to claim 1, further comprising a phase separator which provides an electrically insulating layer between groups of stator windings.

8. A stator according to claim 7, wherein the phase separator is not present in an area where air gaps are present between the coils of adjacent stator slots.

9. A stator according to claim 1, wherein the extended middle shoes comprise a flexible insulating material.

10. A stator according to claim 1, wherein the extended middle shoes have sides which are arranged to at least partially wrap around a coil as the coil extends out of a stator slot.

11. A stator according to claim 1, further comprising lacing for securing the coils, wherein the lacing is located in area away from an area where air gaps are present between the coils of adjacent stator slots.

12. A stator according to claim 1, wherein the stator slots have slot liners, and the slot liners are arranged without a cuff.

13. A stator according to claim 1, wherein the air gaps between adjacent coils allow air to flow in a substantially radial direction through the air gaps.

14. A rotating electrical machine comprising a stator, a rotor, and a fan arranged to provide air flow through the machine, wherein:
the stator comprises a plurality of stator slots each of which accommodates at least two coils of stator windings;
each coil extends in a substantially axial direction for a predetermined distance from a stator slot, and in a substantially circumferential direction in an area beyond the predetermined distance from the stator slot;
the coils are arranged such that radial air gaps are present between the coils of adjacent stator slots as the coils extend out of the stator slots;
insulators are provided between the coils of a stator slot as the coils extend out of the stator slot;
the insulators comprise extended middle shoes which extend out of the stator slots;
each middle shoe is located between an inner coil and an outer coil of a stator slot and provides electrical insulation between the inner coil and the outer coil;
each middle shoe extends out of the stator slots in a substantially axial direction until a point at which a coil begins to bend towards the circumferential direction;
the radial air gaps are defined between the extended middle shoes of adjacent stator slots; and
the radial air gaps between adjacent coils allow air to flow through the stator windings in a substantially radial direction through the radial air gaps and between the coils of two adjacent stator slots.

15. A machine according to claim 14, further comprising a deflector plate which is located radially outwards of the radial air gaps between the coils of adjacent stator slots and which is arranged to direct air flow through the machine from a substantially axial direction to a substantially radial direction.

16. A method of assembling a stator for a rotating electrical machine, the stator comprising a plurality of stator slots each of which accommodates a plurality of coils of stator windings, the method comprising:
inserting the coils into the stator slots such that each coil extends in a substantially axial direction for a predetermined distance from a stator slot and in a substantially circumferential direction in an area beyond the predetermined distance from the stator slot, and such that radial air gaps are present between the coils of adjacent stator slots as the coils extend out of the stator slots; and inserting insulators between the coils of a stator such that the radial air gaps are defined between the insulators of the coils of adjacent stator slots;

wherein:

the insulators comprise extended middle shoes which extend out of the stator slots, each middle shoe is located between an inner coil and an outer coil of a stator slot and provides electrical insulation between the inner coil and the outer coil, each middle shoe extends out of the stator slots in a substantially axial direction until a point at which a coil begins to bend towards the circumferential direction, and the radial air gaps are defined between the extended middle shoes of adjacent stator slots, the radial air gaps allowing air to flow through the stator windings in a radial direction between the coils of two adjacent stator slots.

\* \* \* \* \*